United States Patent
Anderson et al.

(10) Patent No.: US 10,628,278 B2
(45) Date of Patent: Apr. 21, 2020

(54) GENERATION OF END-USER SESSIONS FROM END-USER EVENTS IDENTIFIED FROM COMPUTER SYSTEM LOGS

(71) Applicant: International Business Machines Corporation, Armonk, NY (US)

(72) Inventors: Laura Challman Anderson, Saratoga, CA (US); Cheryl Ann Kieliszewski, San Jose, CA (US); David Allan Pease, Redwood Estates, CA (US); Sridevi Koushik Kanagal Ramesh, San Francisco, CA (US); Jayram Thathachar, Morgan Hill, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 200 days.

(21) Appl. No.: 15/416,937

(22) Filed: Jan. 26, 2017

(65) Prior Publication Data
US 2018/0210802 A1    Jul. 26, 2018

(51) Int. Cl.
G06F 17/30    (2006.01)
G06F 11/30    (2006.01)
G06F 11/34    (2006.01)

(52) U.S. Cl.
CPC .......... *G06F 11/3075* (2013.01); *G06F 11/34* (2013.01); *G06F 11/3476* (2013.01)

(58) Field of Classification Search
CPC .. G06F 11/3075; G06F 11/34; G06F 11/3476; G06F 17/30185

(Continued)

(56) References Cited

U.S. PATENT DOCUMENTS 7,155,514 B1    12/2006    Milford
8,079,081 B1    12/2011    Lavrik et al.
(Continued)

FOREIGN PATENT DOCUMENTS

WO    WO2007134251 A2    11/2007

OTHER PUBLICATIONS

Meiyappan Nagappan, et al., "Abstracting Log Lines to Log Event Types for Mining Software System Logs", MSR 2010, 7th IEEE Working Conference on Mining Software Repositories, May 2-3, 2010, Cape Town, South Africa, 4 pages, IEEE Digital Library.
(Continued)

*Primary Examiner* — Hares Jami
(74) *Attorney, Agent, or Firm* — Ference & Associates LLC (57) ABSTRACT

One embodiment provides a method including: collecting, from a plurality of collaborative computing systems, system log files comprising a plurality of log messages representing activity within the system, wherein the activity within the system corresponds to system activity and end-user activity; generating a plurality of message templates, each of the plurality of message templates representing an event type by clustering the plurality of messages into groups having similar activity patterns; identifying, from the plurality of message templates, a subset of message templates representing potential end-user events; differentiating end-user events from system events, in the subset of message templates representing potential end-user events, comprising identifying a seed set of event types that represent known end-user events and correlating potential end-user events remaining after identifying the seed set of event types with the known end-user events; and grouping, based upon the differentiating, the event types representing end-user events into user sessions.

11 Claims, 4 Drawing Sheets

(58) Field of Classification Search
USPC .................................................. 707/705, 737
See application file for complete search history.

(56) References Cited

U.S. PATENT DOCUMENTS

| | | | |
|---|---|---|---|
| 8,209,567 B2 | 6/2012 | Cohen et al. | |
| 8,495,429 B2 | 7/2013 | Fu et al. | |
| 8,966,036 B1* | 2/2015 | Asgekar | G06Q 50/01 |
| | | | 707/706 |
| 9,131,015 B2 | 9/2015 | Rittle et al. | |
| 9,166,989 B2 | 10/2015 | Huang et al. | |
| 9,171,037 B2 | 10/2015 | Galitsky et al. | |
| 2007/0220604 A1* | 9/2007 | Long | G06F 21/55 |
| | | | 726/22 |
| 2014/0165140 A1* | 6/2014 | Singla | G06F 11/3006 |
| | | | 726/1 |
| 2016/0374128 A1 | 12/2016 | Fukuta et al. | |
| 2017/0013003 A1* | 1/2017 | Samuni | G06F 11/00 |

OTHER PUBLICATIONS

Adetokunbo Makanju et al., "Clustering Event Logs Using Iterative Partitioning", KDD '09, Jun. 28-Jul. 1, 2009, Paris France, 9 pages, ACM Digital Library.

Olfa Nasraoui et al., "Mining Web Access Logs Using Relational Competitive Fuzzy Clustering", IFSA '99, Proceedings of the Eighth International Fuzzy Systems Association World Congress, Aug. 17-20, 1999, Taipei, Taiwan ROC, 19 pages, CiteseerX.

Gui-Rong Xue et al., "Log Mining to Improve the Performance of Site Search", Proceedings of the Third International Conference on Web Information Systems Engineering (Workshops), Dec. 14, 2002, 8 pages, IEEE Computer Society.

* cited by examiner

GENERATION OF END-USER SESSIONS FROM END-USER EVENTS IDENTIFIED FROM COMPUTER SYSTEM LOGS

BACKGROUND

When an activity occurs within a system, a message is recorded within the system log. Examples of system log data may include secure logs, sudo logs, access logs, and the like. The activity may be either initiated by the system, for example, a system initiated log-out, a system information manipulation, and the like, or by an end-user, for example, a log-in, a user manipulating information, a user log-out, and the like. The message may include information that records transactions within the system (e.g., changes in the stored data, etc.), notifications (e.g., failure to execute a command, etc.), and the like. Different entities may mine the system log files to use the event data to serve different goals (e.g., predict system failures, identify system attacks, improved system interaction, etc.). When mining the system log files, the entities generate programs that can differentiate the different event types in order to obtain the desired information. In a collaborative research and development environment, many varied kinds of logs from a multitude of end-users are produced.

BRIEF SUMMARY

In summary, one aspect of the invention provides a method comprising: utilizing at least one processor to execute computer code that performs the steps of: collecting, from a plurality of collaborative computing systems, system log files comprising a plurality of log messages representing activity within the system, wherein the activity within the system corresponds to system activity and end-user activity; generating a plurality of message templates, each of the plurality of message templates representing an event type by clustering, using a clustering algorithm, the plurality of messages into groups having similar activity patterns; identifying, from the plurality of message templates, a subset of message templates representing potential end-user events; differentiating end-user events from system events, in the subset of message templates representing potential end-user events, wherein the differentiating comprises identifying a seed set of event types that represent known end-user events and correlating potential end-user events remaining after identifying the seed set of event types with the known end-user events; and grouping, based upon the differentiating, the event types representing end-user events into user sessions.

Another aspect of the invention provides an apparatus, comprising: at least one processor; and a computer readable storage medium having computer readable program code embodied therewith and executable by the at least one processor, the computer readable program code comprising: computer readable program code that collects, from a plurality of collaborative computing systems, system log files comprising a plurality of log messages representing activity within the system, wherein the activity within the system corresponds to system activity and end-user activity; computer readable program code that generates a plurality of message templates, each of the plurality of message templates representing an event type by clustering, using a clustering algorithm, the plurality of messages into groups having similar activity patterns; computer readable program code that identifies, from the plurality of message templates, a subset of message templates representing potential end-user events; computer readable program code that differentiates end-user events from system events, in the subset of message templates representing potential end-user events, wherein the differentiating comprises identifying a seed set of event types that represent known end-user events and correlating potential end-user events remaining after identifying the seed set of event types with the known end-user events; and computer readable program code that groups, based upon the differentiating, the event types representing end-user events into user sessions.

An additional aspect of the invention provides a computer program product, comprising: a computer readable storage medium having computer readable program code embodied therewith, the computer readable program code comprising: computer readable program code that collects, from a plurality of collaborative computing systems, system log files comprising a plurality of log messages representing activity within the system, wherein the activity within the system corresponds to system activity and end-user activity; computer readable program code that generates a plurality of message templates, each of the plurality of message templates representing an event type by clustering, using a clustering algorithm, the plurality of messages into groups having similar activity patterns; computer readable program code that identifies, from the plurality of message templates, a subset of message templates representing potential end-user events; computer readable program code that differentiates end-user events from system events, in the subset of message templates representing potential end-user events, wherein the differentiating comprises identifying a seed set of event types that represent known end-user events and correlating potential end-user events remaining after identifying the seed set of event types with the known end-user events; and computer readable program code that groups, based upon the differentiating, the event types representing end-user events into user sessions.

A further aspect of the invention provides a method, comprising: utilizing at least one processor to execute computer code that performs the steps of: obtain a plurality of system log files from a plurality of target systems, wherein each of the system log files comprises events corresponding to system activity and end-user activity within the system; producing a plurality of message templates, wherein the producing comprises clustering the events into a groups of events having similar characteristics; identifying a subset of the plurality of message templates as message templates corresponding to potential end-user events and assigning an event type to each of the subset of the plurality of message templates; identifying a seed set of known end-user events from the subset of the plurality of message templates; classifying, using the seed set of known end-user events, the remaining plurality of message templates into end-user events versus system events by using a temporal correlation method; and grouping the identified and classified end-user events into user sessions.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

An analysis of the logs created by end-user activity during an interactive compute session may provide a better indication of how work is completed and how innovation is achieved. One common log analysis method is data mining, in which large databases are examined in order to generate new information. However, during collaborative research activities, the interactions that a multitude of users have with the system produce a variety of different kinds of logs from many single service systems (e.g., web servers, wiki servers, code and data repositories, etc.) that detail various computer system activities (e.g., seeking, creating, testing, sharing). Thus, in collaborative research and development environments, it may be difficult to differentiate between the activities generated by one end-user in relation to another end-user. Additionally, it may also be difficult to differentiate between log files that are produced in response to end-user activity as opposed to log files that are produced in response to system-generated activity.

Due to the multiplicity of heterogeneous system log files generated from collaborative computer services, it can be difficult to determine which log events correspond to end user-generated activities as opposed to system related functions. In order to perform this function, a data miner would need to generate code for mining information for each of the different systems. Such a method would be time consuming and labor intensive. Additionally, due to the number of end-users that can access a collaborative environment, distinguishing between the user events which are generated by one user versus another user may be very difficult causing inaccurate information mining results. Furthermore, due to the amount of messages produced by different end-users, it is difficult to identify any patterns related to end-user activity because the log events are not organized with respect to each end-user and are not further grouped based on end-user sessions.

Accordingly, an embodiment provides a method of mining a plurality of heterogeneous system log files from collaborative computer systems to identify end-user activities and user sessions. An embodiment may collect, from the plurality of computing systems, system log files comprising a plurality of log messages that correspond to activities within the system. These log messages may correspond to either system activities or end-user activities and may not be identified as such by any of the systems. The system may then generate a plurality of message templates, each of the message templates representing an event type. To generate each of the message templates, the system may cluster messages having similar activity patterns into groups. In an embodiment, a subset of message templates representing potential end-user events may be identified.

To identify which of the message templates represent actual end-user events, the system may differentiate the end-user events from the system events by identifying a seed set of event types which are known to represent end-user events. The remaining potential end-user events may be correlated with the known end-user events to determine if they are indeed end-user events or system events. In correlating the potential end-user events to the known end-user events, the system may calculate a correlation similarity measure between the potential and known end-user events. In one embodiment, the correlation similarity measure may be calculated for a particular user. For example, one user may interact with the system in one way, while another user interacts with the system in a different way. Therefore, to accurately calculate a correlation similarity measure, the events may need to be distinguished by user first.

In calculating the correlation similarity measure, the system may identify a time associated with each of the messages within the different events types. The system may then identify a login event and identify the time stamp associated with the login event. A login waiting time distribution for the login event may then be computed. An event waiting time distribution may be computed for each of the event types occurring after the login event. Using a temporal correlation method, the event waiting time distribution may be compared to the login waiting time distribution. This comparison may then be used to determine if the event corresponding to the event waiting time distribution is an end-user event or a system event. In other words, utilizing the temporal correlation analysis the system may determine whether the potential end-user events have a strong likelihood of occurring in conjunction with a known end-user event, and are, thus, more likely than not to be end-user events. An embodiment may then group the determined end-user events into user sessions.

Figure 1:
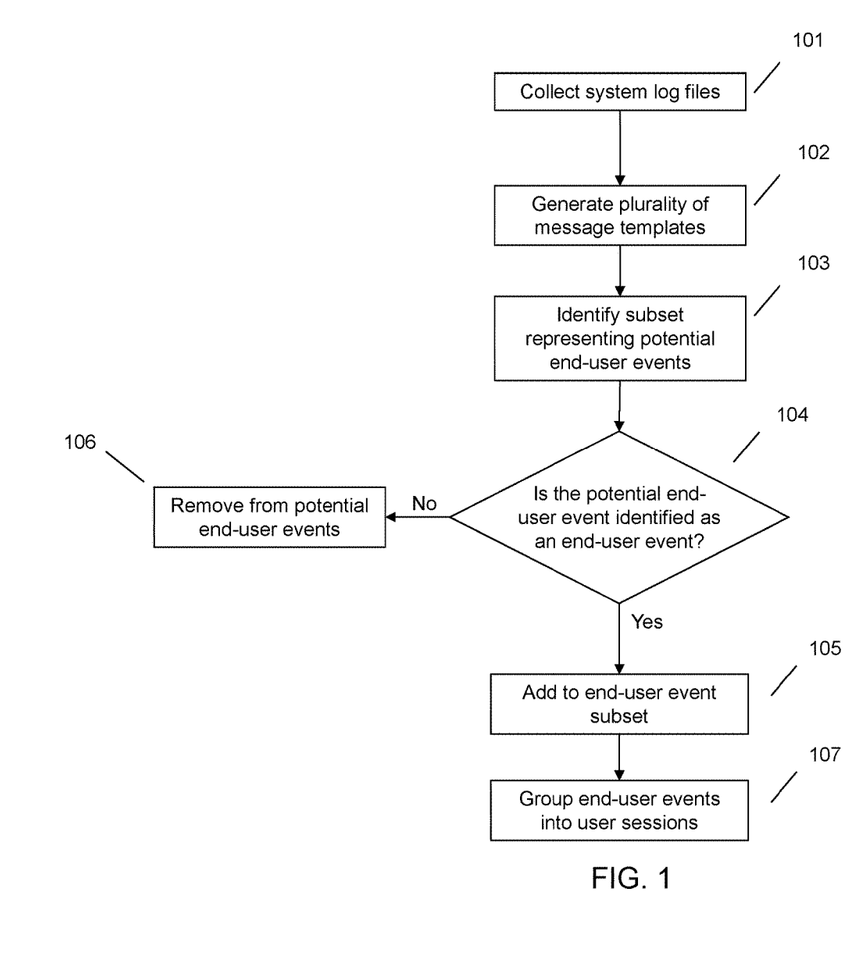
FIG. 1 illustrates a method of generating end-user sessions from end-user events differentiated from system logs in a plurality of system log files.
Figure 2:
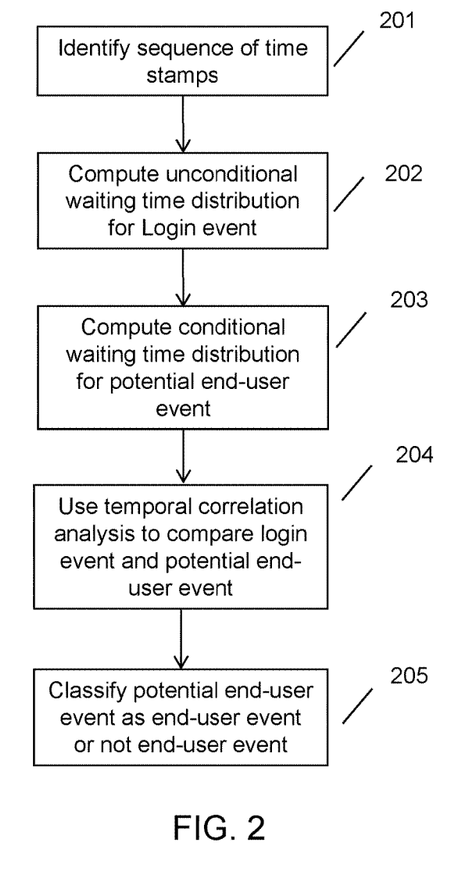
FIG. 2 illustrates an example method to determine the temporal correlation of two events.

Referring now to FIG. 1, at 101, an embodiment may collect, obtain, or otherwise receive, system log files from target systems (e.g., operating systems, application systems, other software, etc.). As discussed before, the target systems may be systems interconnected as a collaborative computing system. The system logs may then be a heterogeneous compilation of all the system logs from all of the systems in the collaborative computing system. A collaborative computing system may be understood to be a computing system which uses and accesses multiple computer hardware and software resources and components and single service systems. For example, a collaborative computing system may include a system which accesses network, local, and cloud storage locations and also accesses web servers, databases, code repositories, company specific software and programs, public software and programs, and the like.

The log files may include records of transactions (e.g. changes in the stored data, accessing data, accessing a software platform, etc.), notifications (e.g., failure to execute a command, successful execution of a command, etc.), and the like. The log files may comprise a plurality of log messages which represent events or activities within a system. The activity may include activity corresponding to either system activity or end-user activity. However, within the log files, activity may not be identified as system activity or end-user activity. For example, both the system and an end-user can perform actions which generate a log-out event. For example, the system can auto log-out a user, or a user can manually log himself or herself out of the system. In one embodiment, only the log files from identified users may be collected from a target system, e.g. from 8 out of 10 users.

At 102, an embodiment may generate a plurality of message templates where each message template represents an event type. Event types may correspond to different activities occurring within the system. Example event types may include login, logout, accessing another system, executing a command, manipulating data within a system, and the like. To generate the message templates, the collected log files may be run through a clustering algorithm that finds messages that have the same or similar activity pattern. A basic message template may then be constructed for each cluster of messages. For example, very common user actions such as logging onto a server or connecting to a website may produce thousands of messages which may detail each action taken by both the user and the system. A clustering algorithm consolidates these numerous types of detailed messages and collapses them into a simplistic template message.

At 103, an embodiment may identify a subset of message templates as templates of interest, for example, those message templates representing potential end-user events. The message template may then be assigned a label which identifies it as a potential end-user event. In an embodiment, the message templates may be reviewed and labelled either manually or programmatically. In an embodiment, as message templates are being identified they are tagged with a label that describes the end-user event or event type that the template corresponds to. For example, the template corresponding to a login event may be labelled as such. In an embodiment, these the selected message templates may be incorporated into a filtering process that subsequently runs the tagged messages against a target system log to retrieve like-kind messages. In other words, the selected message templates may be used to train a message filter for future collection of message templates. In an embodiment, log files of the types identified in 102 are periodically extracted from target systems and tagged as potential end-user events.

At 104, an embodiment may determine if the potential end-user event is actually an end-user event or if it is a system event. To make this determination, an embodiment may differentiate, from the subset of message templates which have been identified as representing potential end-user events, end-user events from system events. To make such a differentiation, an initial seed set of events types may be identified. This initial seed set may represent event types which are known to be end-user events. For example, the system or a user may be able to identify login and logout events as specifically initiated by a user. The system may also identify the end-user events which belong to specific users. The specific user may not be specifically identified, for example, by name or userid. Rather, the system may identify a set of events as belonging to one user and another set of events as belonging to a different user.

After the known end-user events (i.e., the seed set) have been identified from the subset, the system may correlate the remaining potential end-user events with the known end-user events. In correlating the remaining potential end-user events with the seed set the system may calculate or compute a correlation similarity measure between the potential end-user events and the seed set. If the correlation is being made for a particular user, the correlation similarity measure may be computed for that user. To compute the correlation similarity measure, the system may identify a sequence of time stamps for all the messages generated that have been labeled as corresponding to a particular event type at 201. In an embodiment, for each event type, time stamps corresponding to the event type will be noted throughout all of the log files. In an embodiment, the time stamp recording may be noted for each user because different users exhibit different correlations with respect to how they work and how they interact with a system. In an embodiment, time stamps are also noted for every tagged potential end-user event type.

In an embodiment, time stamps for these tagged potential end-user events may also be generated for each particular user.

The system may identify a login event type and a time stamp associated with the login event type. The system may then compute an unconditional waiting time distribution (e.g., an unconditional empirical probability distribution of waiting for an occurrence of the specified event, etc.) for the login event at 202. For each of the event types which have been identified as potential end-user events, the system may compute a conditional waiting time distribution (e.g., a conditional empirical probability distribution of waiting for an occurrence of an specified event given that another event has occurred, etc.) at 203. The event waiting time distribution may be conditional because it is conditional upon the login event occurring. In other words, the event waiting time distribution is calculated for events occurring after the login event. In an embodiment, the waiting time distribution between a fixed event type and a tagged potential end-user event is analyzed to determine the correlation similarity between the two events. In an embodiment, a number of different tests may be available to determine this correlation analysis (e.g. chi squared test, etc.).

If a strong correlation similarity between the fixed event type and the tagged potential end-user event is determined, for example, the timing between the two events lends the potential end-user event to being an end-user event, etc., then it may be concluded that the tagged potential end-user event is an actual end-user event. In one embodiment, the correlation similarity measure threshold may be set by a user so that if the calculated correlation similarity falls below the user set threshold, the two events will be considered unrelated. In some cases, the same event type can sometimes be identified as an end-user event and in other cases it may not be identified as an end-user event. Such disparities reflect the sensitivity of tuning the identification of such events to particular users and time periods.

One embodiment may use a temporal correlation method to determine the correlation between the event waiting time distribution and the waiting time distribution of the login event. The system may compare the waiting time distribution of the login event and the waiting time distribution of the event at 204. The temporal correlation function gives the statistical correlation between at least two sets of variables contingent on the temporal distance between those variables. In an embodiment, an event is considered to be of an end-user type for a particular user whenever the different messages corresponding to the same event type has a strong correlation with a known event type. Thus, the temporal correlation method can then be used to classify the potential end-user event as an end-user event or a system event at 205. In an embodiment, if a potential end-user event is determined to be end-user generated, it may be added to the set of events that are known as end-user events and the process may be repeated at 105. If, however, the potential end-user event is determined to not be an end-user event, the event may be removed from the subset of potential end-user events at 106.

At 106, the system may group event types representing end-user events into user sessions. In an embodiment, when an event is encountered that clearly indicates the beginning of a user session (e.g. a login event, etc.), subsequent log record events, for example, from the same user, etc., are associated with the session initiated by the login event. Similarly, when an end-of-session event occurs (e.g., a logout event, etc.), the session is marked as having ended and the log events that have been collected between the login event and the logout event represent an instance of session activity. Examples of end-user sessions may include web sessions, server access, application use, and the like.

Figure 3:
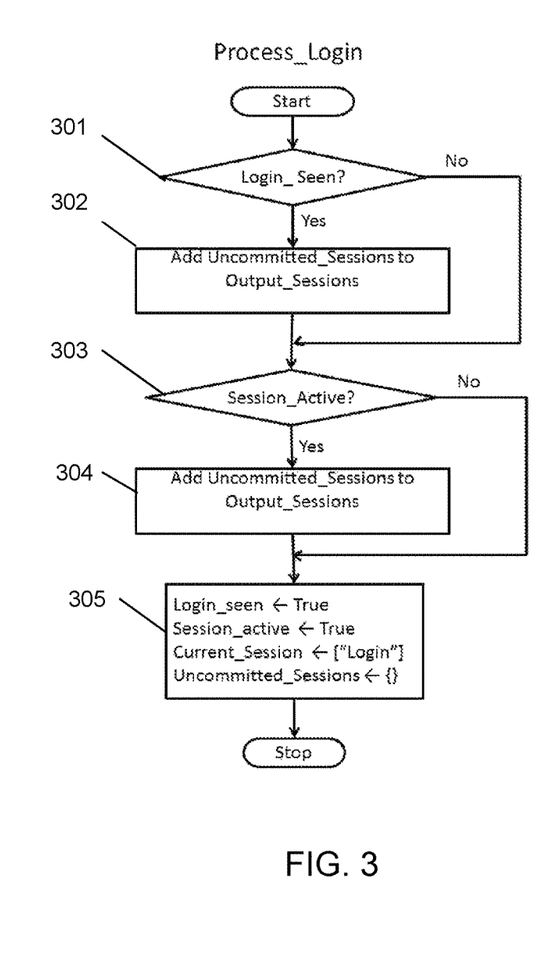
FIG. 3 illustrates an exemplary flow diagram of a grouping process.

FIG. 3 provides a diagram of an example grouping process. As illustrated in FIG. 3, at 301 if an event associated with the beginning of a session is observed, e.g., a login is recorded and determined, any uncommitted sessions are added at 302 to a session group, i.e., Output_Sessions as illustrated in FIG. 3. By way of example, after the login event is observed at 301, events occurring thereafter may be grouped into a session associated with that user login, as illustrated at 302. So long as the session remains active, as determined at 303, the subsequent events may be similarly grouped into the user session, as shown at 304.

If it is determined, as illustrated at 305, that the session is no longer active (e.g., a user logout event is observed and recorded, etc.), the process of grouping the events into the user session may cease. For example, after the session is no longer active, as determined at 303, the events that occurred during the session, here associated with the login event, are grouped into that session and the process is thereafter stopped.

Situations may arise where events that determine the start or end of a user session are not recorded. For example, a user may initiate a login event but forget to logout. In this instance, there is no logout event that is recorded. Therefore, in instances where a session is not bounded by two definite end-user events that signify the beginning and end of the session, determinations need to be made about when a particular session has started and ended. In an embodiment, a sliding time window may be utilized to identify the end of a session. In an embodiment, the threshold for the sliding time window may be set by the user. For example, in an embodiment, the designated sliding time window may be one hour. In such a case, any end-user event that occurs within an hour of a previous event will be considered to be part of the same session. If no end-user event is encountered that occurred within the sliding time window time period, then the session is considered to have ended and any new activity for the same user will be considered to be part of a new session.

In an embodiment, the constructed end-user sessions may then be presented to users, for example, managers of the computer environment, users using the computer environment, data analysists, and the like. The users may use this information to understand system use by project type or end-user type to distinguish between overall system load and human (project or end-user) activity. Additionally, managers may use this information to better allocate system resources based on areas of system utilization.

Figure 4:
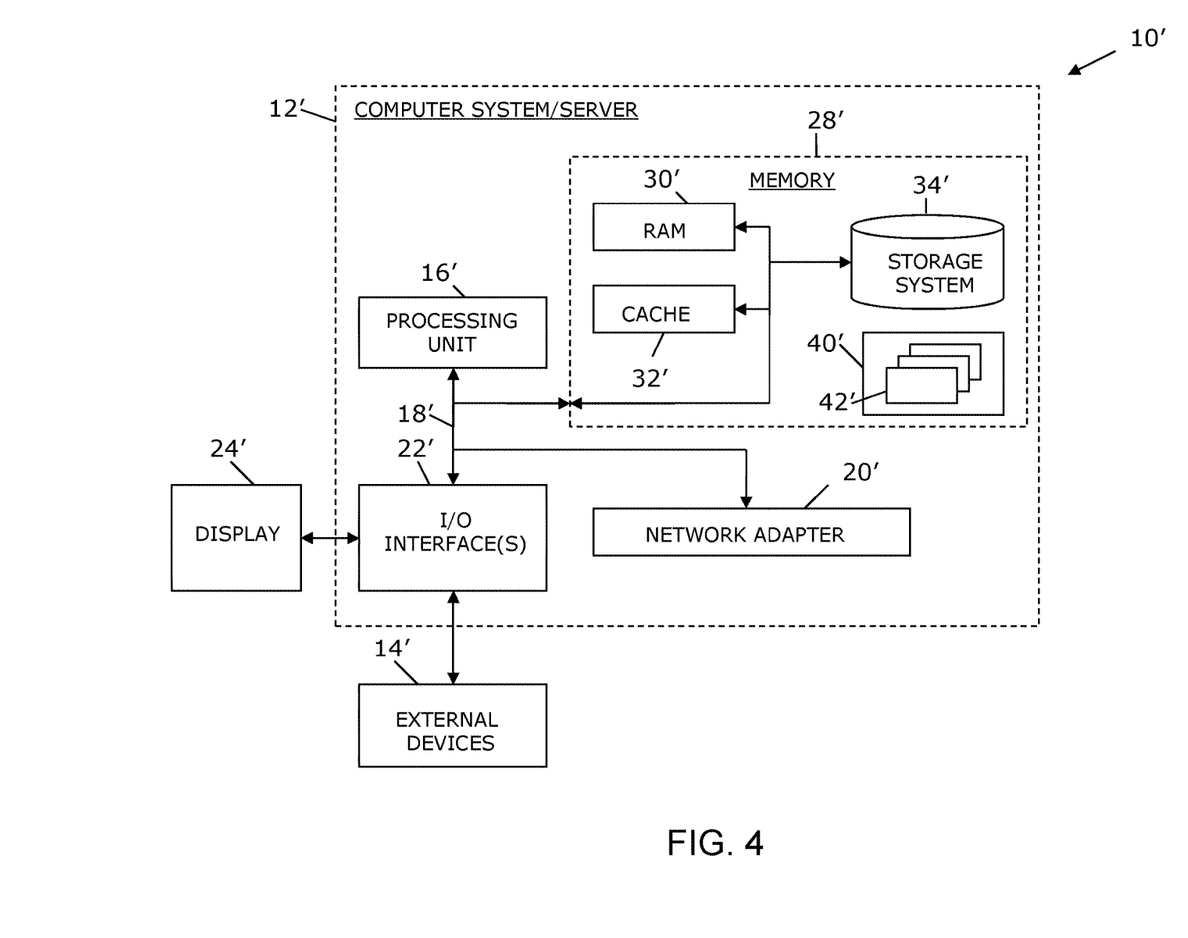
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
collecting, from a plurality of collaborative computing systems, system log files comprising a plurality of log messages representing activity within the system, wherein the activity within the system corresponds to system activity and end-user activity;
generating a plurality of message templates, each of the plurality of message templates representing an event type by clustering, using a clustering algorithm, the plurality of messages into groups having similar activity patterns;
identifying, from the plurality of message templates, a subset of message templates representing potential end-user events;
differentiating end-user events from system events, in the subset of message templates representing potential end-user events, wherein the differentiating comprises identifying a seed set of event types that represent known end-user events and correlating potential end-user events remaining after identifying the seed set of event types with the known end-user events; and
grouping, based upon the differentiating, the event types representing end-user events into user sessions
wherein the differentiating comprises calculating a correlation similarity measure between the potential end-user events and the known end-user events, wherein the calculating a correlation similarity measure comprises:
inspecting the time stamps associated with each message within an event type;
identifying a login event and a time stamp associated with the login event; and
computing a login waiting time distribution for the login event.

2. The method of claim 1, wherein the identifying a subset of potential end-user events comprises labelling a subset of the message templates as potential end-user events.

3. The method of claim 2, comprising generating a message filter by using the labelled subset of message templates to train the message filter.

4. The method of claim 1, comprising tagging each of the subset of message templates representing potential end-user events with an event type.

5. The method of claim 1, wherein the calculating a correlation similarity measure comprises calculating a correlation similarity measure for event types corresponding to a predetermined user.

6. The method of claim 1, wherein the calculating a correlation similarity measure comprises computing an event waiting time distribution for each of the event types occurring after the login event.

7. The method of claim 6, wherein the differentiating event types comprises comparing, using a temporal correlation method, the event waiting time distribution to the login waiting time distribution.

8. An apparatus, comprising:
at least one processor; and
a computer readable storage medium having computer readable program code embodied therewith and executable by the at least one processor, the computer readable program code comprising:
computer readable program code that collects, from a plurality of collaborative computing systems, system log files comprising a plurality of log messages representing activity within the system, wherein the activity within the system corresponds to system activity and end-user activity;
computer readable program code that generates a plurality of message templates, each of the plurality of message templates representing an event type by clustering, using a clustering algorithm, the plurality of messages into groups having similar activity patterns;

computer readable program code that identifies, from the plurality of message templates, a subset of message templates representing potential end-user events;

computer readable program code that differentiates end-user events from system events, in the subset of message templates representing potential end-user events, wherein the differentiating comprises identifying a seed set of event types that represent known end-user events and correlating potential end-user events remaining after identifying the seed set of event types with the known end-user events; and computer readable program code that groups, based upon the differentiating, the event types representing end-user events into user sessions wherein the differentiating comprises calculating a correlation similarity measure between the potential end-user events and the known end-user events, wherein the calculating a correlation similarity measure comprises:
inspecting the time stamps associated with each message within an event type;
identifying a login event and a time stamp associated with the login event; and
computing a login waiting time distribution for the login event.

9. A computer program product, comprising:

a computer readable storage medium having computer readable program code embodied therewith, the computer readable program code comprising:

computer readable program code that collects, from a plurality of collaborative computing systems, system log files comprising a plurality of log messages representing activity within the system, wherein the activity within the system corresponds to system activity and end-user activity;

computer readable program code that generates a plurality of message templates, each of the plurality of message templates representing an event type by clustering, using a clustering algorithm, the plurality of messages into groups having similar activity patterns;

computer readable program code that identifies, from the plurality of message templates, a subset of message templates representing potential end-user events;

computer readable program code that differentiates end-user events from system events, in the subset of message templates representing potential end-user events, wherein the differentiating comprises identifying a seed set of event types that represent known end-user events and correlating potential end-user events remaining after identifying the seed set of event types with the known end-user events; and computer readable program code that groups, based upon the differentiating, the event types representing end-user events into user sessions;

wherein the differentiating comprises calculating a correlation similarity measure between the potential end-user events and the known end-user events, wherein the calculating a correlation similarity measure comprises:
inspecting the time stamps associated with each message within an event type;
identifying a login event and a time stamp associated with the login event and
computing a login waiting time distribution for the login event.

10. The computer program product of claim 9, wherein the calculating a correlation similarity measure comprises computing an event waiting time distribution for each of the event types occurring after the login event.

11. The computer program product of claim 10, wherein the differentiating event types comprises comparing, using a temporal correlation method, the event waiting time distribution to the login waiting time distribution.

* * * * *